United States Patent
Hyatt et al.

(10) Patent No.: US 12,169,924 B2
(45) Date of Patent: *Dec. 17, 2024

(54) SYSTEM AND METHOD FOR SET UP OF PRODUCTION LINE INSPECTION

(71) Applicant: Siemens Aktiengesellschaft, Munich (DE)

(72) Inventors: Yonatan Hyatt, Tel-Aviv (IL); Joel Koenka, Feherto (HU); Harel Boren, Givat Shmuel (IL)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,977

(22) Filed: Jan. 23, 2023

(65) Prior Publication Data
US 2023/0162347 A1 May 25, 2023

Related U.S. Application Data

(63) Continuation of application No. 16/958,714, filed as application No. PCT/IL2018/051398 on Dec. 27, 2018, now Pat. No. 11,562,480.
(Continued)

(30) Foreign Application Priority Data

Jan. 30, 2018 (IL) .......................................... 257256

(51) Int. Cl.
*G06T 7/00* (2017.01)

(52) U.S. Cl.
CPC .................................. *G06T 7/001* (2013.01)

(58) Field of Classification Search
CPC . G06T 2207/20081; G06T 2207/20084; G06T 7/0004; G06T 7/001; G06T 2207/30108; G06T 7/0002; G06T 2207/10016; G06T 2207/30164; G06T 2207/30261; G06T 7/75; G06T 2207/20076; G06T 7/11; G06T 2207/10152; G06T 2207/20221; G06T 2207/30121; G06T 2207/30156; G06T 7/0008; G06T 7/586; G06T 7/62;
(Continued)

(56) References Cited

U.S. PATENT DOCUMENTS

| 11,562,480 B2 * | 1/2023 | Hyatt | G06T 7/0004 |
| 2011/0075159 A1 * | 3/2011 | Chang | G01B 11/105 356/625 |

(Continued)

FOREIGN PATENT DOCUMENTS

WO   WO-2016083897 A2 *   6/2016   ....... G05B 19/41875

*Primary Examiner* — Quan M Hua
(74) *Attorney, Agent, or Firm* — Cozen O'Connor

(57) ABSTRACT

An automatic inspection process for detecting visible defects on a manufactured item, the process including a set up mode in which images of same-type defect free items, but not images of same-type defected items, are obtained, and an inspection mode in which images of both same-type defect free items and same-type defected items, are obtained and defects are detected, where images of the same-type defect free items are analyzed and based on the analysis the process switches to the inspection mode.

13 Claims, 8 Drawing Sheets

Related U.S. Application Data

(60) Provisional application No. 62/611,551, filed on Dec. 29, 2017.

(58) Field of Classification Search
CPC ......... G06T 7/73; G06T 7/97; G01N 21/8851; G01N 2021/8854; G01N 2021/8864; G01N 2021/888; G01N 21/8422; G01N 2021/8825; G01N 2021/8861; G01N 2021/8874; G01N 2021/8887; G06N 3/045; G06N 3/084; G06N 3/04; G06N 20/00; G06N 3/047; G06N 3/08; G06N 3/088; G06V 10/82; G06V 20/58; G06V 20/588; G06V 2201/06; G06V 10/751
See application file for complete search history.

(56) References Cited

U.S. PATENT DOCUMENTS

| | | | |
|---|---|---|---|
| 2013/0336573 A1* | 12/2013 | Dalla-Torre | G06T 7/001 382/145 |
| 2014/0314276 A1* | 10/2014 | Wexler | G06T 3/0012 382/103 |
| 2016/0364686 A1* | 12/2016 | Wolfe | G16H 30/40 |
| 2018/0268257 A1* | 9/2018 | Ren | G06T 7/001 |

* cited by examiner

SYSTEM AND METHOD FOR SET UP OF PRODUCTION LINE INSPECTION

CROSS-REFERENCE TO RELATED APPLICATIONS

This application is a continuation of U.S. patent application Ser. No. 16/958,714, filed Jun. 28, 2020, which is a U.S. National Phase Application under 35 U.S.C. 371 of International Application No. PCT/IL2018/051398, which has an international filing date of Dec. 27, 2018, and which claims priority and benefit from U.S. Provisional Patent Application No. 62/611,551, filed Dec. 29, 2017, and Israel Patent Application No. 257,256, filed Jan. 30, 2018, the contents and disclosure of which are incorporated herein by reference in their entirety.

FIELD

The present invention relates to visual inspection processes, for example, inspection of items on a production line.

BACKGROUND

Inspection during production processes helps control the quality of products by identifying defects and acting upon their detection, for example, by fixing them or discarding the defected part, and is thus useful in improving productivity, reducing defect rates, and reducing re-work and waste.

Automated visual inspection methods are used in production lines to identify visually detectable anomalies that may have a functional or esthetical impact on the integrity of a manufactured part. Existing visual inspection solutions for production lines on the market today rely on custom made automated visual inspection systems, which are typically highly expensive and require expert integration of hardware and software components, as well as expert maintenance of these in the life-time of the inspection solution and the production line.

In addition to the initial high cost of the system, each new manufactured article or new identified defect causes downtime that may be measured in months, between the time a project is initiated until it is deployed. In the interim period, a plant is compelled to use expensive internal/external human workforce to perform quality assurance (QA), gating, sorting or other tasks, or bear the risk and/or production degrade of not performing any of these at one or more parts of the plant production lines.

Some automated visual inspection solutions compare an image of an inspected article to an image of a defect free article and/or use databases of images of possible defects, by which to detect defects in an inspected article. Apart from the burden of creating and updating a database of defects, the imaging environment (such as illumination conditions) greatly affects the visual representation of imaged articles, thereby rendering these solutions often relevant only to a specific item, specific defects and to a specific imaging environment.

Other automated visual inspection solutions may rely on measurements or anomalies detections based on an example of a single article, but still have the burden of expert involvement in setting the surroundings, the camera apparatus and shooting parameters and software, and are also constrained to the specific defects and the specific imaging environment for which the solution was set-up.

There is a growing inconsistency between industrial plants' need for agility and improvement, on one hand, and the cumbersome and expensive set up process of contemporary inspection solutions, on the other hand.

SUMMARY

Embodiments of the invention provide a simple set up of a process for detecting visible defects on a manufactured item.

In one embodiment, an inspection line process includes a set up stage prior to the inspection stage. In the set up stage, samples of a manufactured item with no defects (defect free items) are imaged on an inspection line, the same inspection line or an inspection line having similar set up parameters to those being used for the inspection stage. The images are analyzed by a processor and are then used as reference images for machine learning algorithms run at the inspection stage.

In the inspection stage, inspected items (manufactured items that are to be inspected for defects) are imaged and the image data collected from each inspected item is analyzed by computer vision algorithms such as machine learning processes, to detect one or more defects on each inspected item.

In the set up stage, a processor learns parameters of images of defect free items, for example, imaging parameters (e.g., exposure time, focus and illumination), spatial properties and uniquely representing features of a defect free item in images. These parameters may be learned, for example, by analyzing images of a defect free item using different imaging parameters and by analyzing the relation between different images of a same type of defect free item.

This analysis, using different imaging parameters during the set up stage, enables to discriminatively detect a same type of item (either defect free or with a defect) in a new image, regardless of the imaging environment of the new image.

In addition, the analysis during the set up stage enables to determine if and which imaging parameters should be modulated, to search for optimal imaging conditions for this same item, during the inspection stage. This feature, of the set up stage can help avoid erroneous detection of defects due to different imaging environments.

Additionally, the analysis at the set up stage enables to determine when enough defect free items have been sampled to achieve a statistic confidence level such that a next item can be analyzed for defects without generating false positives or miss detecting the presence of a new item to be inspected.

Further, the analysis during the set up stage enables to determine locations of an item, within a field of view of a camera, in which there is a low confidence level of detection.

These automatic analysis processes in the set up stage, which are performed using only defect free samples (as approved by a user), greatly streamline, facilitate and simplify an automatic inspection process for a manufactured item on a production line, because they enable to provide feedback to a user, prior to running the inspection stage, thereby avoiding wasted time and frustration of the user. For example, feedback to a user may include advising the user when the set up stage is complete and the inspection stage may be launched. Feedback to the user may also include a notification advising the user to correct a location of the set up item or that a type of item is not suitable for the inspection process.

This feedback from the inspection system to a user, which is not usually provided with current inspection systems, greatly simplifies the set up process and enhances the user experience of the inspection line operators, who may otherwise not know how to complete the set up stage to achieve good results during the inspection stage.

In embodiments of the invention, no database of defects is used, only defect-free items are analyzed during the set up stage. Thus, previously unknown or unexpected defects can be detected during the inspection stage.

Thus, in one aspect of the invention an inspection line system is provided. The system includes a processor in communication with a user interface and a camera. The processor determines from an image of an inspected item on an inspection line, if the inspected item has a defect or is defect free. In one embodiment, the processor analyzes an image of a defect free item of a same type as the inspected item and based on the analysis, generates a signal to display on the user interface instructions to a user regarding placement, within a field of view of the camera, of another same-type item.

In one embodiment, the processor analyzes, from images of the defect free item, compositional properties (e.g., spatial decomposition of the defect free item (e.g., possible translations, rotations and scale changes of the imaged item) and/or registration between images of the defect free item).

In one embodiment the processor calculates a probability of determining that a same-type defect free item in a following image will be determined to be defect free, and based on the probability, the processor generates the signal to display.

In some cases at least two images of different same-type defect free items are analyzed by the processor and based on the analysis, a signal is generated, as described above.

In one embodiment, the processor generates a signal to display instructions to the user to place within the field of view of the camera a same-type defect free item or a same-type inspected item. In some embodiments, the processor is to generate a signal to display an error notice to the user indicating that the same-type item cannot be inspected (and thus, the instructions may be to not place any same-type items within the field of view of the camera).

In some embodiments, the processor is to generate a signal to display instructions to the user regarding location or orientation of a same-type defect free item, within the field of view of the camera.

In some embodiments, the processor is to generate a signal to display instructions to limit a region of interest in the image of the defect free item.

In some embodiments the processor is to generate a signal to display instructions related to the camera, e.g., to adjust the distance of the camera from the imaged item or to check that the camera and/or the imaged item are not moving while images are obtained.

In some embodiments, the processor can accept user input via the user interface and can generate a signal, based on the user input. The user input may be, for example, a desired level of accuracy required from the system, or a region of interest in the image of the defect free item.

In some embodiments, an inspection session includes a set up stage and an inspection stage performed on the same inspection line, such that a set up items and an inspected items are imaged in tandem. However, in some embodiments the set up stage and inspection stage are not performed in a single inspection session. In this case, set up parameters (e.g., distance of the item from the camera and/or location of the item within the field of view) used during the set up stage may be saved and used later in the inspection stage to obtain images of inspected items.

Another aspect of the invention provides a method for an automatic production line inspection process. The process includes a set up mode in which images of same-type defect free items but not images of same-type defected items, are obtained, and an inspection mode in which images of both same-type defect free items and same-type defected items, are obtained and defects are detected.

In one embodiment, the method includes analyzing the images of the same-type defect free items and switching to the inspection mode based on results of the analysis.

The method may further include generating a signal to provide output to a user based on the results of the analysis. The output may include information or instructions regarding the same-type defect free items, for example, instructions to the user regarding placement, on an inspection line, of a defect free item, or information to the user regarding the process.

BRIEF DESCRIPTION OF THE FIGURES

The invention will now be described in relation to certain examples and embodiments with reference to the following illustrative figures so that it may be more fully understood. In the drawings.

DETAILED DESCRIPTION

Figure 1A:
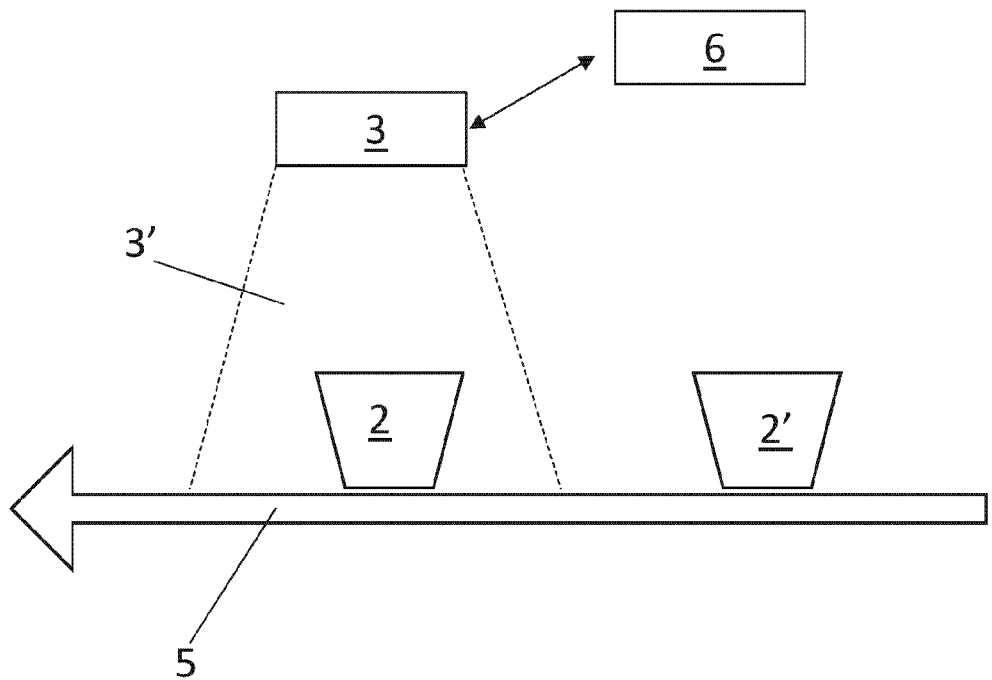
FIGS. 1A, 1B and 1C schematically illustrate systems for production line inspection, operable according to embodiments of the invention.
Figure 1B:
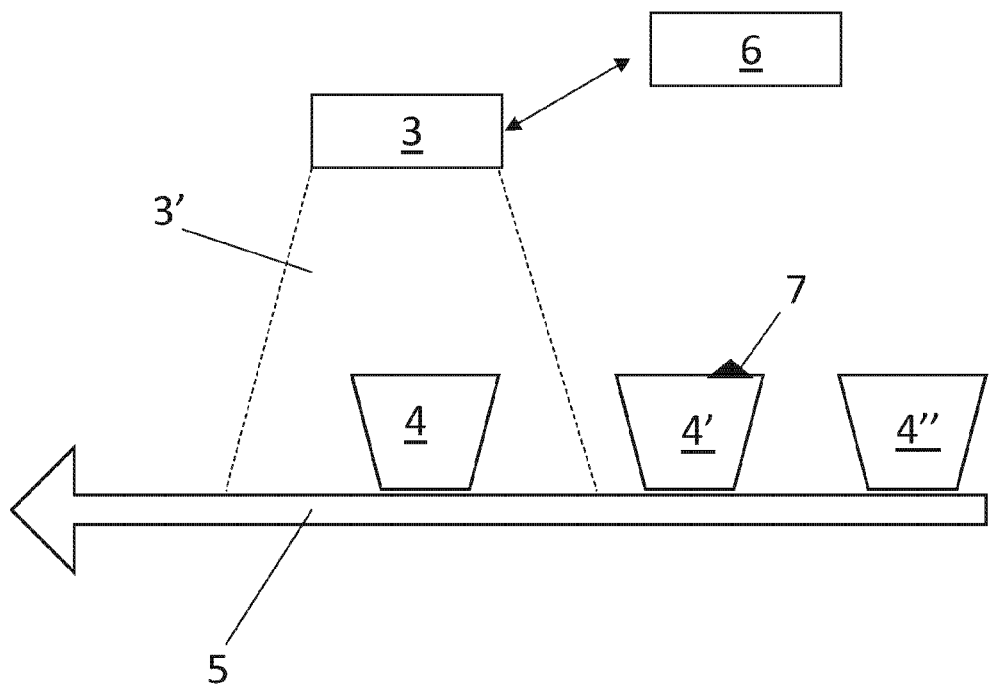

A production line visual inspection system, carrying out a production line inspection process according to one embodiment of the invention, is schematically illustrated in FIGS. 1A and 1B. The production line inspection process, typically occurring at a manufacturing plant, includes a set up stage (FIG. 1A) and an inspection stage (FIG. 1B).

In the set up stage two or more samples of a manufactured item of the same type, with no defects, e.g., defect free sample items 2 and 2', are placed in succession within a field of view (FOV) 3' of (one or more) camera 3. For example, defect free sample items 2 and 2' may be placed on an inspection line which includes conveyor belt 5 such that movement of the conveyor belt 5 first brings item 2 into the FOV 3' and then brings item 2' into the FOV 3'.

Each defect free sample item 2 and 2' is imaged by camera 3. These images, which may be referred to as set up images, are obtained by using on each image different imaging parameters of camera 3, for example different focuses and exposure times. The set up images are analyzed to collect information, such as, spatial properties and discriminative features of the type of item being imaged. Spatial properties may include, for example, 2D shapes and 3D characteristics of an item. Discriminative features typically include digital image features (such as used by object recognition algorithms) that are unique to an item and can be used to discriminate between the item and background in the image Once it is determined, based on the analysis of the set up images, that enough information about the item is obtained, the set up stage may be concluded and a notification is displayed or otherwise presented to a user, via a user interface 6, to stop placing samples (sample items 2 and 2') on the conveyor belt 5 and/or to place on the conveyor belt 5 inspected items 4, 4' and 4" (as shown in FIG. 1B).

In the inspection stage (FIG. 1B) that follows the set up stage, inspected items 4, 4' and 4", which are of the same type as sample items 2 and 2' and which may or may not have defects, are imaged in succession by camera 3 and these images, which may be referred to as inspection images, are analyzed using computer vision techniques (e.g., machine learning processes) to detect defects in items 4, 4' and 4". In the example illustrated in FIG. 1B, item 4' includes a defect 7, whereas items 4 and 4" are defect free.

A defect may include, for example, a visible flaw on the surface of an item, an undesirable size, shape or color of the item or of parts of the item, an undesirable number of parts of the item, a wrong or missing assembly of its interfaces, a broken or burned part, an incorrect alignment of an item or parts of an item, a wrong or defected barcode, and in general, any difference between the defect free sample and the inspected item, which would be evident from the images to a user, namely, a human inspector in the production line. In some embodiments a defect may include flaws which are visible only in enlarged or high resolution images, e.g., images obtained by microscopes or other specialized cameras.

The term "same-type items" refers to items that are of the same physical makeup and are similar to each other in shape and dimensions and possibly color and other physical features. Typically, items of a single production series, batch of same-type items or batch of items in the same stage in its production line, may be "same-type items". For example, if the inspected items are sanitary products, different sink bowls of the same batch are same-type items.

In one example, defect free sample items 2 and 2' and inspected items 4, 4' and 4" include a sanitary ware product or part of a sanitary ware product, such as a sink. The flaws detected may include, for example, scratches on the surface of the sink, discoloration of the sink, an incorrect size and/or shape of the drain hole of the sink, an incorrect location of the drain hole, an undesirable shape of the sink bowl, dislocated or erroneously sized components latched or screwed to the sink, etc., and in general—any difference between images of defect free sink samples and images of inspected sinks, which would be detected as a defect by a human inspector.

In another example, defect free sample items 2 and 2' and inspected items 4, 4' and 4" may include a candy box and the flaws detected may include an incorrect number of candies in the box, incorrect color of one or more candies in the box, incorrect position of one or more candies in the box, incorrect labeling on the candies or the candy box, missing barcode and price-tag, etc., and in general, any difference between images of the candy box set up sample and images of the inspected candy box, which would be detected as a defect by a human inspector.

Figure 1C:
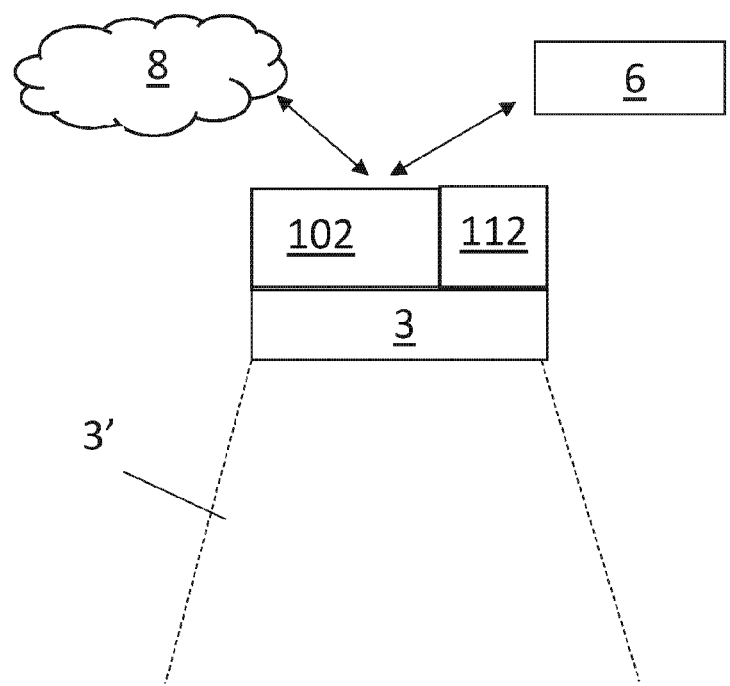

A system for production line inspection, which may be operable in the processes illustrated in FIGS. 1A and 1B, according to an embodiment of the invention, is schematically illustrated in FIG. 1C.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "analyzing", "processing," "computing," "calculating," "determining," "detecting", "identifying" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Unless otherwise stated, these terms refer to automatic action of a processor, independent of and without any actions of a human operator.

In one embodiment, the system exemplified in FIG. 1C includes a processor 102 to receive image data of an inspection line from one or more image sensor, such as camera 3, to analyze the image data and to output a signal to a user interface 6.

In the context of this description, image data may include data such as pixel values that represent the intensity of reflected light as well partial or full images or videos.

Processor 102 may include, for example, one or more processors and may be a central processing unit (CPU), a graphics processing unit (GPU), a digital signal processor (DSP), a field-programmable gate array (FPGA), a microprocessor, a controller, a chip, a microchip, an integrated circuit (IC), or any other suitable multi-purpose or specific processor or controller. Processor 102 may be locally embedded or remote.

Processor 102 is typically in communication with a memory unit 112. In one embodiment the memory unit 112 stores executable instructions that, when executed by the processor 102, facilitate performance of operations of the processor 102, as described below. Memory unit 112 may also store at least part of the image data received from the camera 3.

Memory unit 112 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Processor 102 receives (from one or more cameras 3) one, or in some embodiments, at least two, set up images of defect free, same-type items on an inspection line. The processor 102 then analyzes the set up images and generates a signal to display on the user interface 6, instructions to a user regarding adding a sample item or an inspected item to the inspection line, based on the analysis.

In one embodiment, processor 102 receives a single set up image and can analyze the image, for example, to identify typical features of the imaged item and/or to compare different parts of the image. In another embodiment processor 102 receives a plurality of set up images, namely, images of defect free same-type sample items (e.g., items 2 and 2'). The processor 102 analyzes the set up image(s) to determine if enough information is obtained about the type of item so that the same type of item can be detected in a new image, e.g., in an inspection image, namely, in an image of an inspected item (e.g., inspected items 4, 4' or 4"). Additionally, the processor 102 analyzes the set up images to determine if enough statistical confidence is achieved that a same-type item can be detected in a new image and that no false positives will be detected in a new image of a same-type defect free item. For example, statistical confidence can be achieved based on comparison of set-up images to each other to determine that there are no images showing perspective distortion, to determine alignment of images, to determine correct detection of defect free items, and more, as described herein.

If enough information and/or statistical confidence are obtained based on the analysis of the set up images, processor 102 may generate a "switch to inspection mode" signal to cause a notification to be displayed or otherwise presented by user interface 6 so that a user may know that it is possible to stop placing sample items on the inspection line and/or to begin placing inspected items on the inspection line.

If, based on the analysis of the set up images, processor 102 determines that more information is needed, the processor 102 may generate a "continue in set up mode" signal to cause notification to be displayed or otherwise presented by user interface 6 so that a user may know that he needs to place more sample items within the FOV 3'.

Processor 102 may also generate a signal to display or otherwise present instructions to a user to locate or position or orient the sample items at specific locations or positions or orientations, within the FOV 3'.

If, based on the analysis of the set up images, processor 102 determines that not enough information can be obtained, the processor 102 may generate a signal to cause notification to be displayed or otherwise presented by user interface 6, to update (e.g., limit or change) a region of interest. In some embodiments processor 102 may generate an "error" signal to cause notification to be displayed or otherwise presented by user interface 6 so that a user may know that this type of item cannot be inspected. Cases in which "not enough information can be obtained" may include cases in which, for example, alignment of images cannot be obtained, causing the system to (falsely) detect defects in items that are known to be defect-free.

In some cases processor 102 may determine, based on analysis of the set up images that there is not enough light (e.g., not enough light to create short enough exposures without suffering from long exposures issues such as smoothed images and rolling shutter artifacts). In this case processor 102 may generate a signal to cause notification to be displayed or otherwise presented by user interface 6, to adjust the camera, e.g., to bring the camera and/or the illumination closer to the imaged item in order to increase the illumination level.

In some cases processor 102 may determine, based on analysis of the set up images that a static image of the item cannot be obtained (for example, by performing dense (pixel-by-pixel) registration of consecutive images and checking for motion in the whole or parts of the imaged item). In this case, processor 102 may generate a signal to cause notification to be displayed or otherwise presented by user interface 6, to check that the camera is well secured; to check that the item is fully static on the inspection line before moving on to a next item and/or to check that all moving parts on the item are fully static before moving on to a next item.

The analysis of the set up images may include, for example, using different imaging parameters (as described above), detecting discriminative features of sample items in the set up images, analyzing spatial decomposition (as described above) of the sample items and analyzing the obtained defect detection results when applied between different defect-free set-up images.

The analysis may be used to determine parameters such as an optimal focus, to obtain aligned images by registration of the images, to detect an external boundary of the item, etc. Thus, registration of set up images may be analyzed to find optimal parameters to enable the best alignment between the images.

Once enough images are obtained to provide understanding of the above mentioned parameters and spatial properties of the imaged items and a high enough level of confidence is achieved, instructions may be displayed to switch from set up mode to inspection mode, namely, to add inspected items rather than sample items, to the inspection line. However, if, for example, based on the analysis, it is determined that optimal focus cannot be established and/or that alignment between different images cannot be accomplished and/or that part of the imaged item is in saturation and/or that the exterior boundary of the item is not identifiable and/or that defect detection algorithms run by the system cannot converge to provide a defect free detection on a defect free image, then the processor 102 may generate an "error" signal to cause notification to be displayed or otherwise presented by user interface 6 so that a user may know that this type of item cannot be inspected.

For example, the user interface 6 may include a monitor or screen and the notification may be visual (e.g., text or other content displayed on the monitor). In another example, the user interface 6 may include a light that may light up or change color based on the signal generated by processor 102. In yet another example, the user interface 6 includes an audio player to emit a sound based on the signal generated by processor 102. In other embodiments user interface 6 may include other suitable media by which to communicate with a user.

In some embodiments, user interface 6 is designed to accept user input. For example, user interface 6 may include a monitor and keyboard and/or mouse, to enable a user to define a region of interest in a set up image. Thus, a set up image may be displayed to the user on the monitor and the user may then use the keyboard or mouse or other input device to mark a region of interest on the displayed set up image. Based on this user input processor 102 may limit or focus analysis to the marked region of interest, thereby facilitating the set up stage.

In some embodiments, if imaging parameters cannot be optimized, or registration or alignment of set up images is not accomplished, processor 102 generates a signal to display instructions to limit or otherwise amend the region of interest in the set up image. A user may then indicate, via user interface 6, a new or different region of interest in the setup image, which processor 102 is to analyze.

In some embodiments, a user may input, via user interface 6, a desired outcome of the inspection process, e.g., a desired level of accuracy required from the inspection process, which is taken into account during analysis of the set up images by processor 102.

User interface 6 may be further used in the inspection stage (FIG. 1B) to notify the user regarding inspected items found to have a defect. In some embodiments, user interface 6 can accept user input during the set up stage and/or during the inspection stage. For example, a user may input instructions, e.g., to configure the system, e.g., to display or output different alerts to defects detected on different parts of an inspected item.

In another embodiment, a user may indicate via user interface 6 that a specific inspected item is defect free even if the system reported a defect. This user input can be used by the system to update and improve set up information (e.g., as described below).

One or more camera(s) 3, which is placed or positioned in relation to the inspection line (e.g., conveyor belt 5) such that items placed on the inspection line are within the FOV 3', may include a CCD or CMOS or other appropriate chip and an optical system. The camera 3 may be a 2D or 3D camera. In some embodiments, the camera 3 may include a standard camera provided, for example, with mobile devices such as smart phones or tablets. In some embodiments user interface 6 may be part of a multi purpose device such as a smart phone, tablet or personal computer.

In some embodiments, the system may include a light source, e.g., LEDs or other known light sources. The light source may be attached to and/or surround or may be otherwise fixed in relation to camera 3 to illuminate an item on the inspection line. An optical system of camera 3 may include, for example, a lens and a light polarizer. The light polarizer may be embedded in the camera or mounted outside the lens and may be supplied with a motor to enable switching polarization angles.

In some embodiments, image data from the camera 3 may be uploaded to a remote device 8, e.g., a server on the cloud or a server or central controller at the manufacturing plant.

In some embodiments, information about the set up stage and/or about a type of item may be stored at a set up database on a local storage device and/or on remote device 8, to be retrieved in the future.

Information about the set up stage typically includes set up parameters such as locations and/or distances of the set up items from the camera.

Information about a type of item may include, for example, the spatial and compositional properties of defect free items, a characterization of the items (e.g., ID, description, barcode, etc.), date and duration of the set up stage performed for the type of item, etc.

Typically, the database at remote device 8 is arranged such that information of set up parameters and specific types of items (e.g., sink model X and candy box Y) are identifiable and can be retrieved and used by processor 102. For example, in a case where an inspection stage of a manufactured item is stopped because of a problem in the line, the inspection stage may be resumed after the problem is fixed without having to repeat the set up stage, by using the information about the item and/or set up parameters saved from the set up stage of that type of item.

Processes according to embodiments of the invention may occur at the remote device 8 and/or locally.

All or some of the components of the system described in FIG. 1C may be in wired or wireless communication, and may include suitable ports and/or network hubs. In some embodiments processor 102 may communicate with a device, such as remote device 8 and/or user interface 6 via a controller, such as a programmable logic controller (PLC), typically used in manufacturing processes, e.g., for data handling, storage, processing power, and communication capabilities. A controller may be in communication with processor 102 and/or other components of the system, via USB, Ethernet, appropriate cabling, etc. Some components, e.g., camera 3, may include a suitable network hub.

Figure 1D:
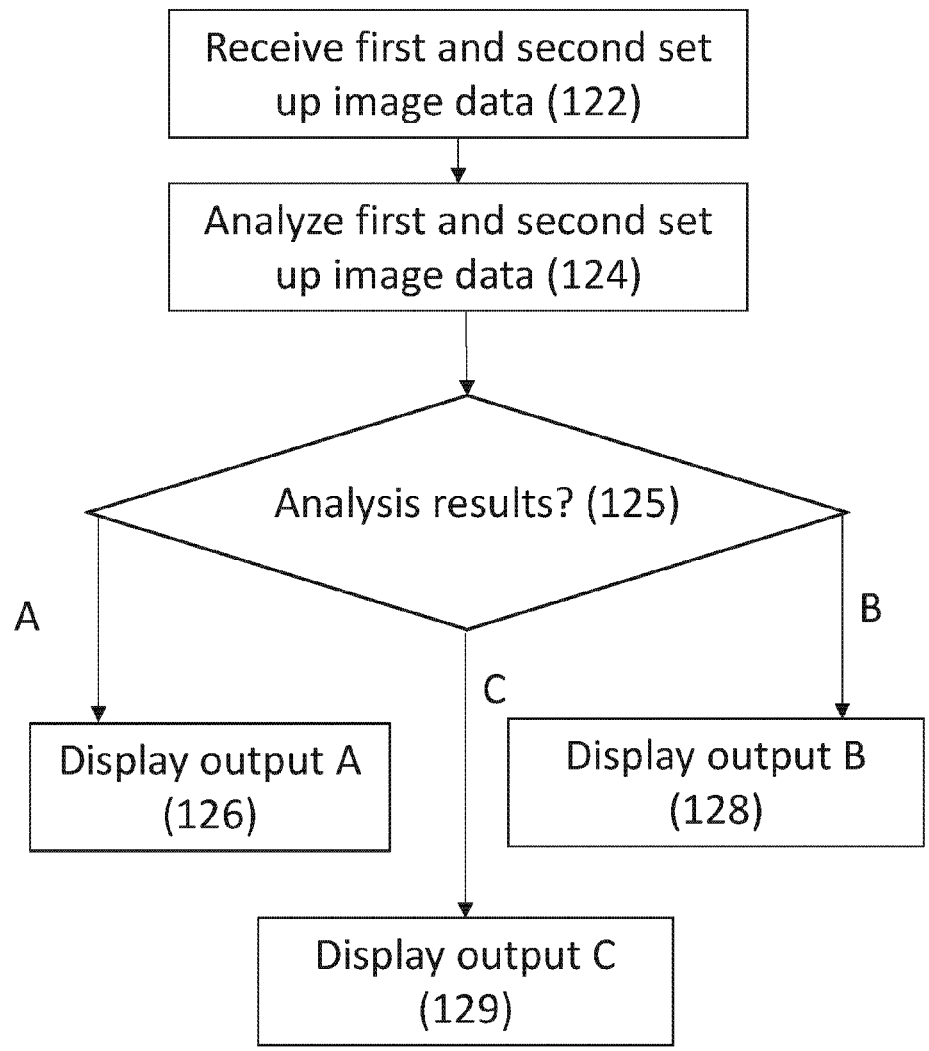
FIG. 1D schematically illustrates a method of set up stage in a system for production line inspection, according to embodiments the invention.

An embodiment of a set up stage of an inspection process carried out by the system described in FIG. 1C, is schematically shown in FIG. 1D. The processes described below refer, for simplicity, to "images", however it should be appreciated that the processes described herein may be carried out on image data other than or in addition to full images.

In one embodiment first and second set up images are received (122) at processor 102 (e.g., from camera 3). Each of the set up images includes one defect free sample item. The first set up image includes a defect free sample item of the same type of item (but not the same item itself) as the second set up image.

The first and second set up images are analyzed (124) and a signal is generated, based on the analysis. The signal may cause different outputs to be displayed to a user, based on the analysis result (125). If the analysis provides a first result (result A) then a first output (output A) is displayed (126). If the analysis provides a second result (result B) then a second output (output B) is displayed (128). A third result (result C) will cause a third output (Output C) to be displayed (129), and so on. Outputs may be displayed on user interface 6.

The different outputs may include instructions to a user (or lack of instructions) or notification or other types of communication with a user.

Systems and method according to embodiments of the invention enable providing feedback to a user, prior to (and during) the inspection stage, which avoids wasted time and frustration from the user, thereby greatly enhancing the visual inspection process.

According to embodiments of the invention a production line inspection process includes a set up stage in which defect free same-type items are imaged and an inspection stage in which manufactured items of the same type are imaged.

In one embodiment, the method includes operating a processor in set up mode (which includes analyzing first and second set up images of defect free same-type items) and continuing in set up mode or switching to inspection mode (which includes running a machine learning process to detect defects in images of inspected items), based on the analysis of the first and second set up images.

Figure 2:
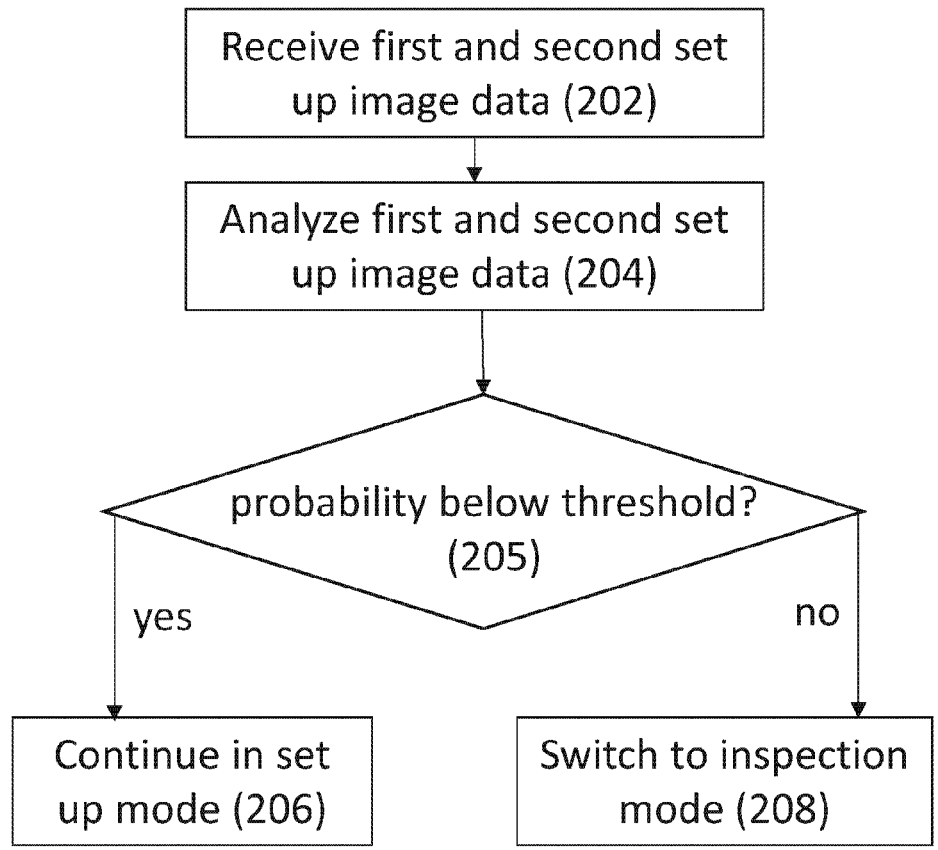
FIG. 2 schematically illustrates an inspection process, according to embodiments of the invention.

In an exemplary embodiment, which is schematically illustrated in FIG. 2, first and second set up images are received (202) at processor 102 (e.g., from camera 3). Each of the set up images includes one defect free sample item. The first set up image includes a defect free sample item of the same type of item (but not the same item itself) as the second set up image.

The first and second set up images are analyzed (204) and a signal is generated, based on the analysis. As described above, the signal may cause different outputs to be displayed to a user, based on the analysis result.

In one embodiment, the signal may cause to display on a user interface instructions to a user regarding adding a set up item or an inspected item to the inspection line. Thus, if based on the analysis of the first and second set up images, the processor continues in set up mode then a signal is generated to display instructions to add a sample item to the inspection line. If based on the analysis of the first and second set up images, the processor switches to inspection mode then a signal is generated to display instructions to add an inspected item to the inspection line.

In some embodiments, no instructions are displayed as long as the processor continues in set up mode but if the processor switches to inspection mode then instructions are displayed. Alternatively, instructions may be displayed while the processor is in set up mode but no instructions are displayed once the processor switches to inspection mode.

In one embodiment the analysis includes calculating a probability (statistical confidence) that a same-type item can be detected in a new image and that no false positives will be detected in a new image of a same-type defect free item. If the probability is low, e.g., below a threshold (205) the processor continues in set up mode and the output of the processor to the user interface causes display of instructions to add a sample item to the inspection line (206). If the probability is high, e.g., above the threshold (205), the processor may switch to inspection mode and the output of the processor to the user interface causes display of instructions to add an inspected item to the inspection line (208).

Set up mode typically means that the processor is analyzing the type of item presented to it and optionally gathering more defect-free samples of the item. In set up mode, the processor does not usually output information about detected defects, whereas inspection mode typically means that the processor outputs information about defects detected in items.

Analysis of the sample images is used to create an essentially complete representation of a type of item, for example, to collect information regarding spatial properties, e.g., possible 2D shapes and 3D characteristics (e.g., rotations on the inspection line) of an item or to find uniquely discriminative features of the item and the spatial relation between these unique features, as preserved between the sample images. Based on the information collected from sample, defect-free items, a processor (e.g., processor 102) can detect a second item of the same type even if the second item was not previously presented. This allows the processor to detect when a new item (of the same type) is imaged, and then to analyze the new item to determine if it is in allowed locations (as described below) and search for a defect on an inspected item based on analysis of sample items.

In one embodiment, the analysis of the set up images is used to determine a spatial range, in which the defect free sample item shows no perspective distortion. The level of perspective distortion between samples can be analyzed, for example, by detecting regions in an item which do not have corresponding features between the set up images, by analyzing the intersection location and angles between the item's borders or the item's marked areas of interest, etc. The borders of the spatial range may be calculated by comparing two (or more) set up images (in which sample items may be positioned and/or oriented differently) and determining which of the images show perspective distortion and which do not.

The calculated range can then be used to determine the borders of where and/or in which orientation, scale or other dispositioning, an inspected item may be placed on the inspection line to avoid distortion. Additionally, by using a set of set up images as references for each other, the processor can detect images having similar spatial decomposition and this set of images can then be analyzed to see if there are enough similar set up images to allow registration, defect-detection and other analyses for each possible location on the inspection line. Based on this analysis the processor may continue in set up mode or switch to inspection mode (and generate indication to the user accordingly).

Figure 3:
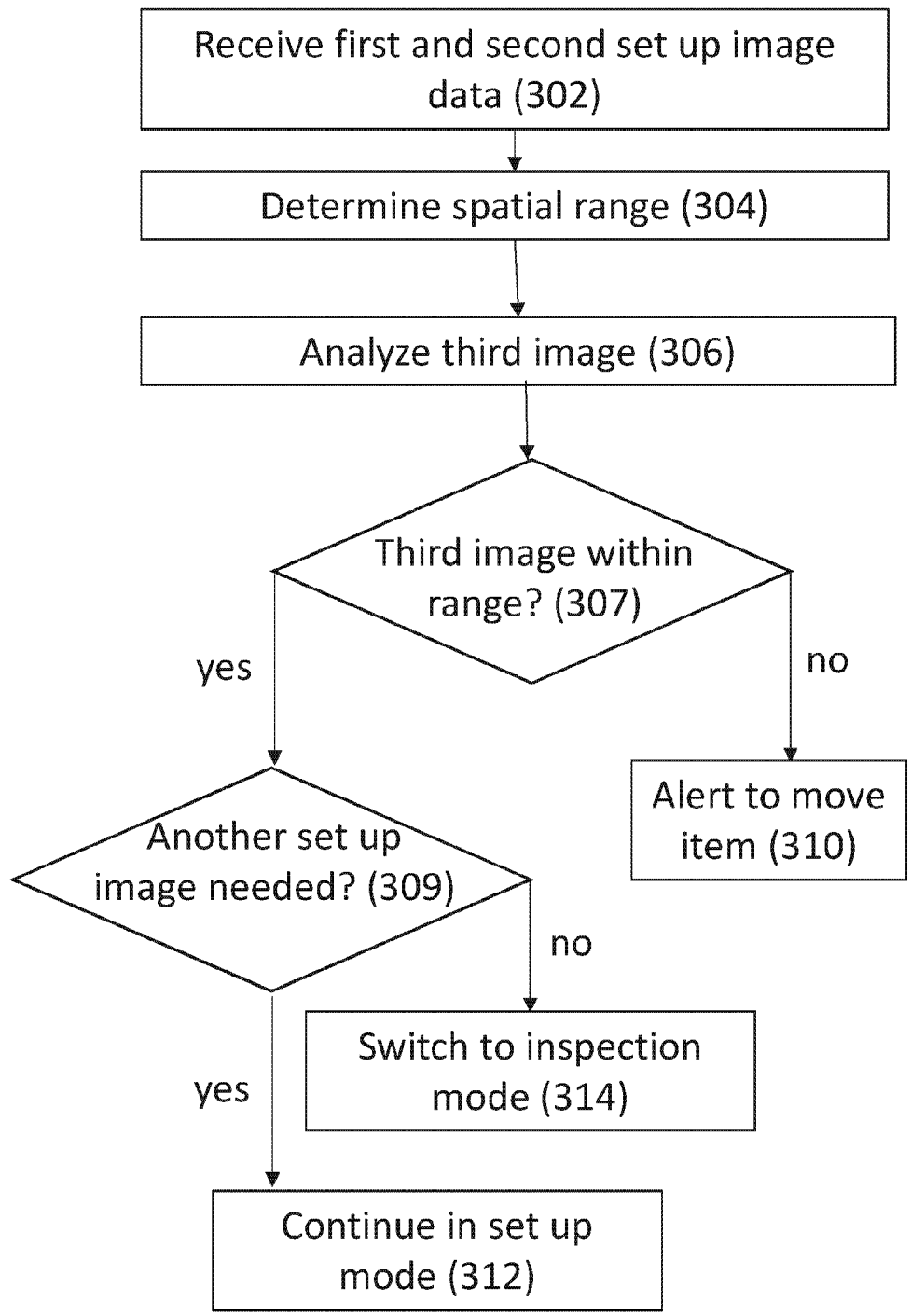
FIG. 3 schematically illustrates a set up stage of an inspection process using perspective distortion, according to an embodiment of the invention.

In an exemplary embodiment, which is schematically illustrated in FIG. 3, first and second set up images are received (302), e.g., at processor 102. The first and second images are compared to determine a spatial range in which the set up images show no perspective distortion (304). A third set up image is compared to the first and second set up images (306) to determine the perspective distortion of the item in the third image relative to the first and second set up images. If the item in the third set up image is within the range (307) then it is further analyzed to determine whether another set up image is needed (309), in which case the processor will continue in set up mode (312) or, if another set up image is determined not to be needed, the processor can switch to inspection mode (314).

If the item in the third set up image is not within the range (307) then an alert is issued to the user to move the item (310) or to add more reference images with similar perspective. Possibly the alert includes instruction as to how to position or locate the item, or where to place more items so that the third image will show similar perspective.

In some embodiments, processor 102 may detect that there is a requirement for another sample item/s in an area in the FOV 3', to broaden the range, so that samples placed near that area in the FOV will not be detected as showing perspective distortion. Processor 102 may generate a signal to request a sample to be placed in that area to obtain the missing information. Thus, for example, a signal may be generated to cause an image of the inspection line to be displayed (e.g. on user interface 6) with a mark of a location and/or orientation so that a user can place a third (or next) defect free sample item on the production line at the location and/or orientation marked in the image displayed to him.

In some embodiments, the signals generated based on the comparison of sample images may cause notifications, rather than instructions, to be displayed or otherwise presented to a user. For example, another set up image is determined to be needed in step (309) depending on the probability that a same-type item can be detected in a new image and that no false positives will be detected in a new image of a same-type defect free item. If the probability is below a threshold, a signal may be generated to cause the set up mode to continue (312) and possibly no notification and/or instruction is displayed to a user. If the calculated probability is above the threshold, a signal may be generated to switch to inspection mode (314) and possibly a notification to be displayed that the inspection stage may be started.

The threshold may be predetermined (e.g., a preset probability) or may be adjustable or dynamic. For example, a user may input (e.g., via user interface 6) a desired level of accuracy required from the inspection system and the threshold for the probability of no false positives being detected, is set according to the user input.

As discussed above, the decision to switch from set up mode to inspection mode (and to generate a signal to display instructions to place sample items or inspected items on the inspection line) may be based on analysis of compositional properties of an item, e.g., possible translations, rotations and scale changes of the imaged item. In one embodiment, the defect free sample item in a first set up image may be positioned or located within the FOV 3' differently than the item in a second set up image, such that the item in the second set up image may be rotated, translated or differently scaled compared with the item in the first set up image. A transformation matrix of the item may be created based on this difference and the transformation matrix may be decomposed to provide an understanding of the possible translations and rotations and scale changes of the imaged item.

As part of the analysis of compositional properties of an item, registration of set up images may be performed.

Analysis of the registration results may uncover, for example, a typical perspective distortion for spatial movement that cannot be tolerated (e.g., distortion that does not enable alignment of images in all of the imaged set up items' areas and/or exposes new areas of the item or hides some areas of the item). Consequently, this analysis may define an "allowed" range to avoid distortion and to enable alignment and detection of defects in the full area of the item. If too few set up images fall in the allowed range such that alignment cannot be accomplished, the system would require more set up images to bridge this gap.

In one embodiment the processor (e.g., processor 102) receives input (e.g., from a user) indicating one or more region of interest (ROI) which is typically a more limited area of the full image, such that analysis of compositional properties and defect-detection is done on the ROIs rather than on the whole image.

ROIs may be created using polygons, bounding boxes, circles and/or adding holes to all of the above. In another embodiment, pixel level segmentation may be used or automatic segmentation may be used to split the image to different objects and allow the user to choose the segments representing the area of interest. In some embodiments both a user indication and automatic algorithms may be used to create an ROI, e.g., a user may mark a bounding box and an automatic algorithm then creates a polygon tightened to the item border closest to the bounding box, or the algorithm may create a polygon from a user chosen segment, etc.

Figure 4:
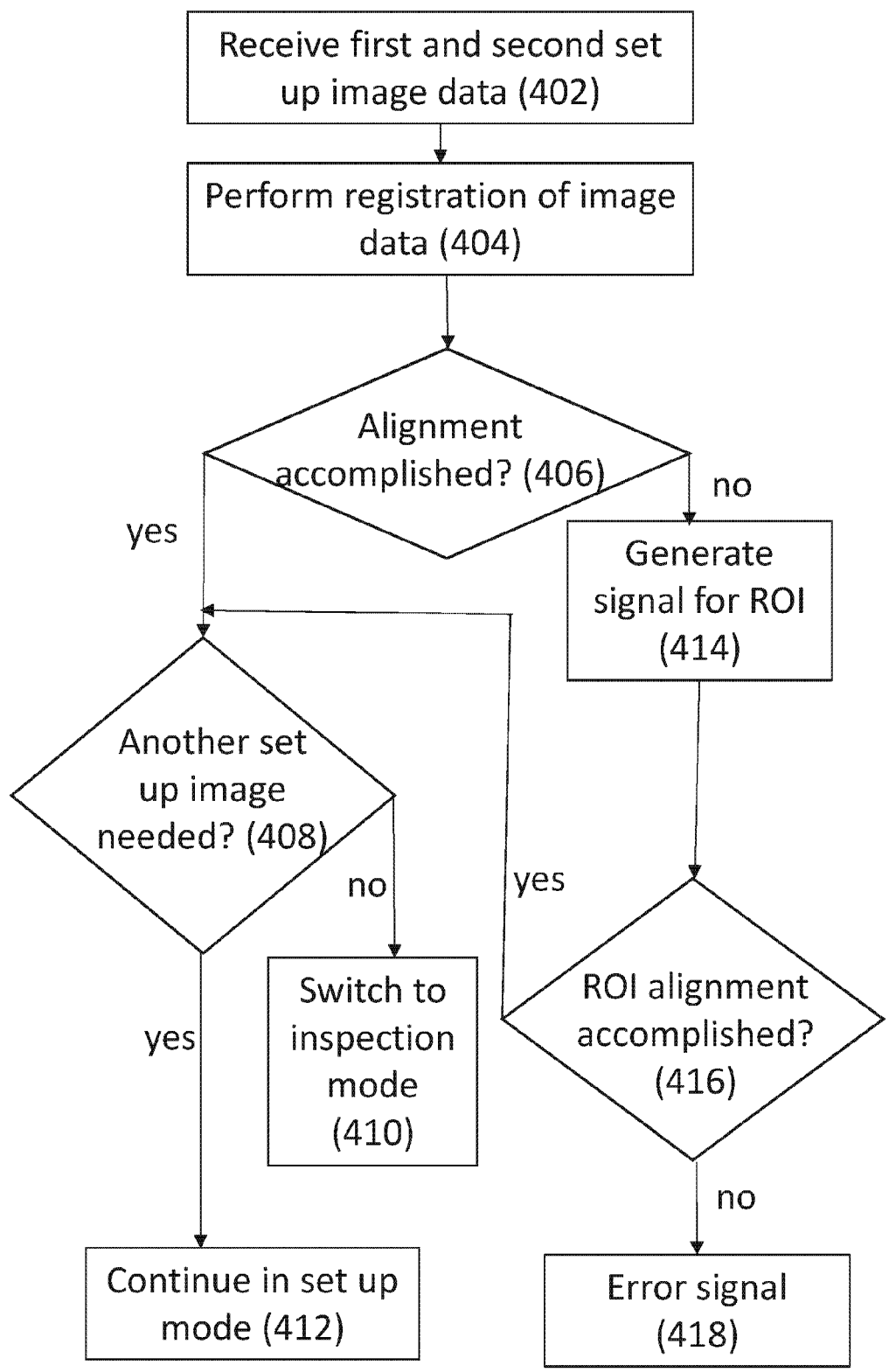
FIG. 4 schematically illustrates a set up stage of an inspection process using image registration, according to an embodiment of the invention.

In one exemplary embodiment, which is schematically illustrated in FIG. 4, first and second set up images are received (402), e.g., at processor 102 and registration is performed on the images (404). If alignment is accomplished (406) and, possibly, if it is determined that a further set up image is not needed (408), the processor can proceed to inspection mode (410) (and generate a signal, e.g., to display instructions to place an inspection item on the inspection line). If it is determined that another set up image is required (408) then the processor continues in set up mode (412) and generates a signal, e.g., to display instructions to place a sample item on the inspection line.

If alignment of the first and second image is not accomplished (406) then the processor may generate a signal to display indication that the same-type object cannot be inspected.

In one embodiment, if alignment of the first and second image is not accomplished (406) then the processor generates a signal to display instructions to limit or amend the region of interest in the set up images (414).

If alignment of the limited ROIs is not accomplished (416) then the processor generates a signal to display a message that the same-type object cannot be inspected (418), e.g., an error notice. If alignment of the limited ROIs is accomplished (416) then the processor may proceed to inspection mode, possibly after determining if another set up image is required (408).

Figure 5:
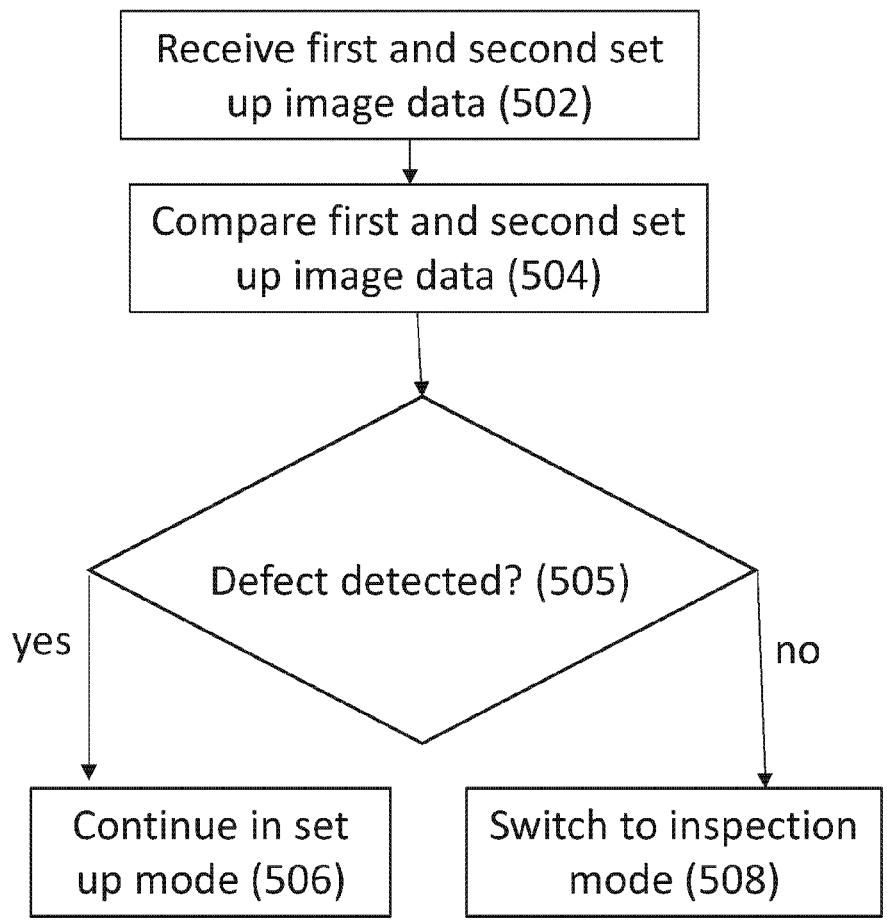
FIG. 5 schematically illustrates analysis of set up images during a set up stage of an inspection process, according to an embodiment of the invention.

In another embodiment, which is schematically illustrated in FIG. 5, the analysis of set up images is used to better understand what a defect free item looks like, to raise the probability of detecting the item in future images and raising the probability of detecting defects on the item.

In the example illustrated in FIG. 5, first and second (or more) set up images are received (502) at a processor (e.g., processor 102) and are compared (504). The second set up image may be compared to one or more set up image(s) most similar to it (for example, an image having the same perspective as the second image), which may include the first set up image or other set up images. Assuming that the first and second set up images both include defect free items, if, compared to the first set up image, the second set up image shows a defect on the item, it can be deduced that a defect is incorrectly identified in the second set up image. Accordingly, more images of defect free items should be supplied to the processor to raise the probability of correctly identifying a defect.

Thus, if a defect is detected in the second image (505) a signal may be generated to continue in set up mode and possibly, to cause instructions or notifications to be displayed (506). If no defect is detected in the second image (505), a signal may be generated to switch to inspection mode and possibly to cause instructions or notifications to be displayed (508).

Figure 6:
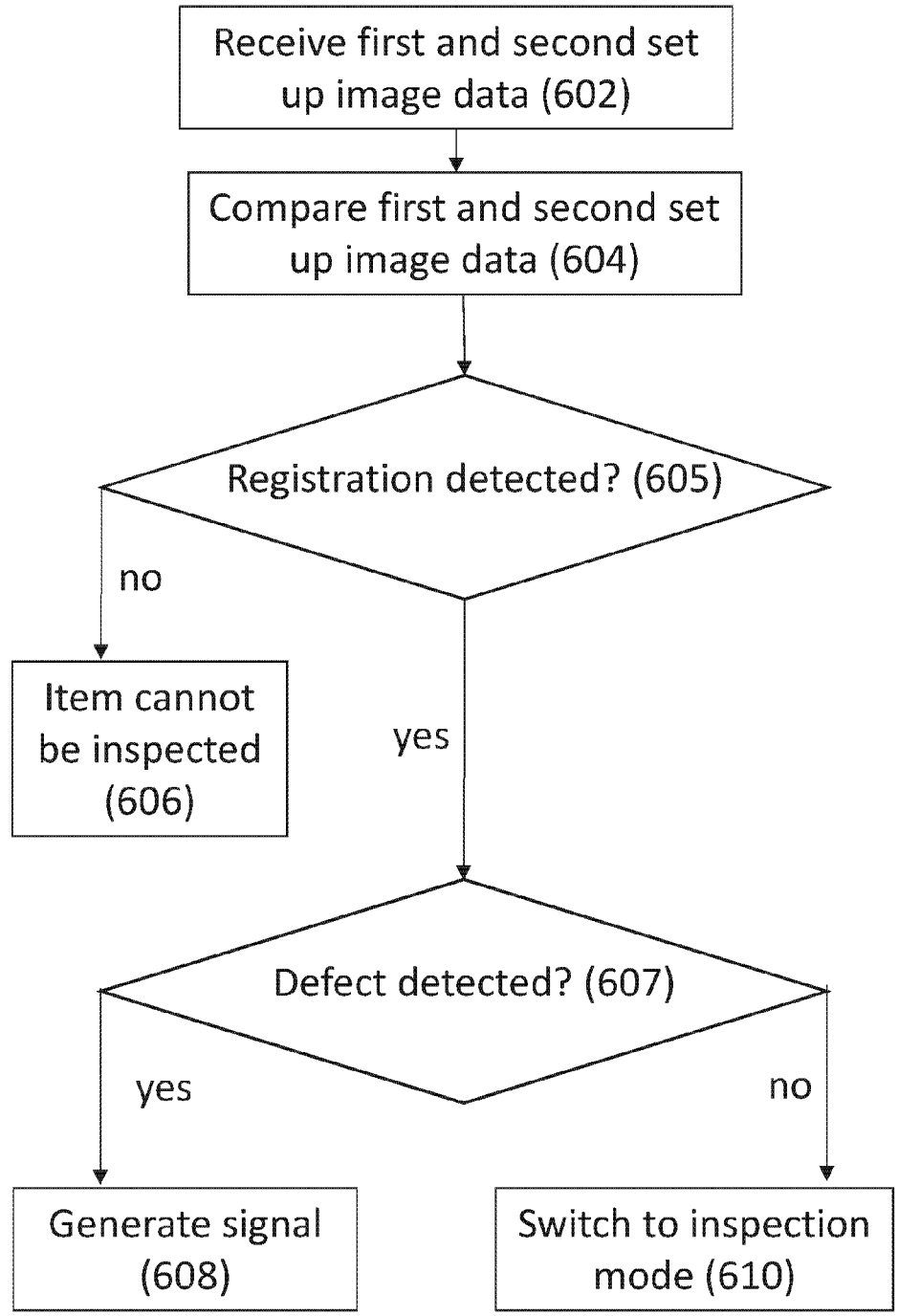
FIG. 6 schematically illustrates using an ROI in a set up stage of an inspection process, according to an embodiment of the invention.

In one embodiment, an example of which is schematically illustrated in FIG. 6, if defects are found while comparing set up images, then the processor may determine that the type of item being imaged cannot be inspected and an error signal may be generated to notify the user.

In the example illustrated in FIG. 6, first and second (or more) set up images are received (602) at a processor (e.g., processor 102). The set up images are compared (604) to detect registration between the images. If registration between the first and second image is detected (605), and a defect is detected in the second set up image (607), this may mean that the item includes flaws that are not defects but which are perceived as defects by the processor, such as, moving parts (e.g., movable parts of the item). For example, the transformation matrix of moveable parts may be different from the transformation matrix of the entire item or the region of the item in which the moving part is located, and may not be recognized by the processor at setup stage. Including the moving parts in the set up image may incur false positive defect detection for the non-aligned moving-parts in this example. In this case, a signal may be generated (608) to cause instructions to be displayed, e.g., to select a region of interest that does not include the moveable areas in the item. Thus, a user may mark an ROI on a defect free sample in a set up image (e.g., via user interface 6) to limit or focus image processing calculations to the marked region of interest.

In some embodiments, instead of causing instructions to be displayed, the signal generated (608) causes an "error" notification to be displayed (e.g., via user interface 6) indicating that the type of item being imaged cannot be inspected.

However if registration between the first and second set up image is not detected (605), this may be due to fluid, smooth or saturated parts of the imaged item and the processor generates a signal (606) to cause an "error" notification to be displayed (e.g., via user interface 6) indicating that the type of item being imaged cannot be inspected.

If registration between the first and second set up image is detected (605), and no defect is detected in the second set up image (607), this could indicate that enough set up images have been collected and the processor may proceed to inspection mode (610).

The method for production line inspection according to embodiments of the invention provides a set up stage that greatly expedites and simplifies the inspection process. The set up stage, according to embodiments of the invention, enables a manufacturing plant to set up an automatic inspection process in the imaging environment prevalent at the plant, possibly using any camera and illumination. Additionally, user frustration and waste of time may be avoided in cases where manufactured items cannot be easily (or at all) inspected.

What is claimed is:

1. An inspection line system comprising;
a processor in communication with a user interface and a camera wherein the processor is configured to:
determine from an image of an inspected item on an inspection line, during an inspection stage, whether the inspected item has a defect or is defect free
analyze images of defect free items of a same type as the inspected item; and
generate a signal to provide instruction to a user, via the user interface, prior to the inspection stage, an indication that the type of the inspected item cannot be inspected to avoid user frustration when, based on the analysis, a predetermined amount of information about the type of inspected item cannot be obtained; and
wherein the analysis comprises comparing the images of the defect free items captured by the camera with each other to collect information about the type of inspected item.

2. The system of claim 1, wherein the determination whether a predetermined amount of information about the type of inspected item cannot be obtained comprises determining whether optimal focus cannot be established.

3. The system of claim 1, wherein the determination whether a predetermined amount of information about the type of inspected item cannot be obtained comprises determining whether alignment between the images of defect free items cannot be accomplished.

4. The system of claim 1, wherein the determination whether a predetermined amount of information about the type of inspected item cannot be obtained comprises determining whether at least part of the defect free item is in saturation.

5. The system of claim 1, wherein the determination whether a predetermined amount of information about the type of inspected item cannot be obtained comprises determining whether an exterior boundary of the defect free item is not identifiable.

6. The system of claim 1, wherein the determination whether a predetermined amount of information about the type of inspected item cannot be obtained comprises determining whether defect detection algorithms executed by the system cannot converge to provide a defect free detection on a defect free image.

7. A method for inspection of an item, the method comprising:
analyzing, by a processor, images of same type items on an inspection line by comparing to each other images of the same type items captured by a camera to collect information about the same type items prior to an inspection stage of the same type items; determining, via the processor, based on the analysis, whether a predetermined amount of information about the same type item cannot be obtained; and generating a signal to provide an indication that the same type item cannot be inspected based on the determination, the indication being provided to a user, via a user interface, prior to the inspection stage to avoid user frustration.

8. The method of claim 7, wherein the determination whether a predetermined amount of information about the same type item cannot be obtained comprises determining whether optimal focus cannot be established.

9. The method of claim 7, wherein the determination whether a predetermined amount of information about the same type item cannot be obtained comprises—determining whether alignment between the images of the same type item cannot be accomplished.

10. The method of claim 7, wherein the determination whether a predetermined amount of information about the same type item cannot be obtained comprises—determining whether at least part of the same type item is in saturation.

11. The method of claim 7, wherein the determination whether a predetermined amount of information about the same type item cannot be obtained comprises—determining whether an exterior boundary of the same type item is not identifiable.

12. The method of claim 7, wherein the images of same type items comprise images of defect free same type items.

13. The method of claim 12 wherein the determination whether a predetermined amount of information about the same type item cannot be obtained comprises determining whether a defect free detection determination cannot be obtained.

* * * * *